US012651673B2

(12) United States Patent
Yoon et al.

(10) Patent No.: US 12,651,673 B2
(45) Date of Patent: Jun. 9, 2026

(54) MULTI-LAYERED NUCLEAR FUEL CLADDING AND METHOD FOR MANUFACTURING MULTI-LAYERED NUCLEAR FUEL CLADDING

(71) Applicant: GACHON UNIVERSITY OF INDUSTRY-ACADEMIC COOPERATION FOUNDATION, Seongnam-Si (KR)

(72) Inventors: Young Soo Yoon, Seoul (KR); Kang Soo Lee, Seongnam-Si (KR); Sung Pil Woo, Ulsan (KR); In Yea Kim, Guri-Si (KR)

(73) Assignee: GACHON UNIVERSITY OF INDUSTRY-ACADEMIC COOPERATION FOUNDATION (KR)

( * ) Notice: Subject to any disclaimer, the term of this patent is extended or adjusted under 35 U.S.C. 154(b) by 314 days.

(21) Appl. No.: 18/221,854

(22) Filed: Jul. 13, 2023

(65) Prior Publication Data

US 2023/0360811 A1     Nov. 9, 2023

Related U.S. Application Data

(62) Division of application No. 16/489,693, filed as application No. PCT/KR2018/004435 on Apr. 17, 2018, now abandoned.

(30) Foreign Application Priority Data

Apr. 18, 2017     (KR) ........................ 10-2017-0049971

(51) Int. Cl.
G21C 3/20          (2006.01)
B21C 37/06          (2006.01)
(Continued)

(52) U.S. Cl.
CPC ................ *G21C 3/20* (2013.01); *B21C 37/06* (2013.01); *C22C 16/00* (2013.01); *F16L 9/18* (2013.01); *G21C 3/07* (2013.01)

(58) Field of Classification Search
CPC .. G21C 3/20; G21C 3/07; G21C 21/02; C22C 16/00; Y02E 30/30; F16L 9/02; F16L 9/18; B21C 37/154
See application file for complete search history.

(56) References Cited

U.S. PATENT DOCUMENTS 4,728,491 A     3/1988 Reschke et al.
4,751,044 A     6/1988 Hwang et al.
(Continued)

FOREIGN PATENT DOCUMENTS

JP          S5524786 A     2/1980
JP          S5764413 A     4/1982
(Continued)

OTHER PUBLICATIONS

Kuprin ("Vacuum-arc chromium-based coatings for protection of zirconium alloys from the high-temperature oxidation in air") Journal of Nuclear Materials 465 (2015) 400e406 (Year: 2015).*
(Continued)

*Primary Examiner* — Angelo Trivisonno
(74) *Attorney, Agent, or Firm* — Renaissance IP Law Group LLP

(57)          ABSTRACT

Multi-layered nuclear fuel cladding, according to the present inventive concept, comprises: an inner tube of zirconium alloy, of which both ends are open for providing an accommodation space into which a sintered nuclear fuel pellet is inserted; and an outer tube, disposed coaxially with the inner tube, having a greater diameter than the inner tube so as to surround the outer surface of the inner tube, wherein the outer tube and the inner tube are fixed to closely contact each (Continued)

other, and may be formed from metals different from each other.

7 Claims, 6 Drawing Sheets

(51) Int. Cl.
C22C 16/00 (2006.01)
F16L 9/18 (2006.01)
G21C 3/07 (2006.01)

(56) References Cited

U.S. PATENT DOCUMENTS

| | | | |
|---|---|---|---|
| 4,775,508 A | 10/1988 | Sabol et al. | |
| 4,986,957 A | 1/1991 | Taylor | |
| 5,524,032 A | 6/1996 | Adamson et al. | |
| 6,033,493 A | 3/2000 | Hertz et al. | |
| 2015/0050521 A1 | 2/2015 | Le Flem et al. | |

FOREIGN PATENT DOCUMENTS

| JP | S6144143 A | 3/1986 |
|---|---|---|
| JP | S6239787 A | 2/1987 |
| JP | H0364427 A | 3/1991 |
| JP | H0442094 A | 2/1992 |
| JP | H08285975 A | 11/1996 |
| JP | H10510005 A | 9/1998 |
| JP | H10273746 A | 10/1998 |
| JP | 2001158928 A | 6/2001 |
| JP | 2008026182 A | 2/2008 |
| KR | 20090117414 A | 11/2009 |
| KR | 100963472 B1 | 6/2010 |
| KR | 20140147404 A | 12/2014 |
| KR | 20150010963 A | 1/2015 |
| KR | 101595436 B1 | 2/2016 |
| WO | 2002024366 A1 | 3/2002 |
| WO | 2004077452 A1 | 9/2004 |
| WO | WO-2015111825 A1 * | 7/2015 | ............... F16L 9/18 |

OTHER PUBLICATIONS

WO-2015111825-A1 English machine translation (Year: 2025).*

Cverna, Fran, ed. "ASM ready reference: thermal properties of metals", Asm International, 2002, Chapter 2 "thermal expansion", https://www.owlnet.rice.edu/~msci301/ThermalExpansion.pdf (Year: 2002).

International Search Report for PCT/KR2018/004435 mailed Jul. 5, 2018.

Kim, Hyun-Gil et al., "Development Status of Accident-tolerant Fuel for Light Water Reactors in Korea", Nuclear Engineering and Technology, vol. 48, Issue 1, Feb. 2016, pp. 1-15.

Kuprin, A.S. et al., "Vacuum-arc chromium-based coatings for protection of zirconium alloys from the high-temperature oxidation in air", Journal of Nuclear Materials, vol. 465, Oct. 2015, pp. 400-406.

Mughabghab, S. F., "Thermal neutron capture cross sections resonance integrals and g-factors", International Atomic Energy Agency, International Nuclear Data Committee, Vienna, Austria, Feb. 1, 2003.

Whitmarsh, C L., "Review of Zircaloy-2 and Zircaloy-4 Properties Relevant to N.S. Savannah Reactor Design", US Atomic Energy Commission, Oak Ridge National Lab, Oak Ridge, TN, US, Jul. 23, 1962.

Written Opinion for PCT/KR2018/004435 mailed Jul. 5, 2018.

* cited by examiner (a)                    (b)

MULTI-LAYERED NUCLEAR FUEL CLADDING AND METHOD FOR MANUFACTURING MULTI-LAYERED NUCLEAR FUEL CLADDING

TECHNICAL FIELD

The present disclosure herein relates to a multi-layered nuclear fuel cladding and a method for manufacturing the multi-layered nuclear fuel cladding, and more particularly, to a multi-layered nuclear fuel cladding and a method for manufacturing the multi-layered nuclear fuel cladding, in which an inner tube and an outer tube are formed from metals different from each other.

BACKGROUND ART

In general, nuclear power plants, where steam is generated by heat generated by nuclear fission, and electrical energy is produced by operating a turbine using the force of generated steam, are each constituted by several folds of protective walls in order to prevent leakage of radioactive materials and protect the safety of the nuclear power plants. Among these, a nuclear fuel cladding, which is a second protective wall, encloses a sintered body of nuclear fuel and functions to isolate first-system cooling water circulating a nuclear reactor from nuclear fuel causing nuclear fission, prevent nuclear fission products generated during a nuclear fission reaction from moving to the first-system cooling water, and effectively transfer the heat generated by nuclear fission to the first-system cooling water.

A great amount of energy is generated by a nuclear fission chain reaction of nuclear fuel at the reactor core of the nuclear reactor equipped with nuclear fuel claddings therein, and thus, the first-system cooling water circulating through the nuclear reactor receives thermal energy and not only functions to vaporize water in a second system, but also should cool down the heat generated by nuclear fission reaction at the reactor core of the nuclear reactor while circulating inside the nuclear reactor.

However, as the Fukushima nuclear power plant was exploded due to a stop in cooling water circulation caused by cutoff of power supply, when cooling water is not smoothly supplied due to reasons such as failure of cooling system which should cool down huge heat generated by nuclear fission, there is a problem in that not only the internal temperature of a nuclear reactor pressure vessel accommodating the reactor core of the nuclear reactor rapidly rises, but also a rapid oxidation reaction occurs while the material constituting a nuclear fuel cladding reacts with high-temperature steam.

When the material constituting the nuclear fuel cladding reacts with high-temperature steam ($H_2O$) and is oxidized due to loss in a cooling function, a large amount of hydrogen is generated, and the generated hydrogen is concentrated in an upper portion of the nuclear reactor pressure vessel, and when the hydrogen is accumulated to raise the hydrogen concentration in the upper portion of the nuclear reactor pressure vessel, a big problem occurs in which the hydrogen reacts with oxygen and hydrogen explosion is caused. In the Fukushima nuclear disaster, hydrogen was generated in nuclear fuel claddings due to a stop in cooling water circulation, and the hydrogen concentrated in an upper portion of a nuclear reactor building reacts with air and causes hydrogen explosion.

Moreover, radioactive materials, which are nuclear fission products, may leak to the outside due to high-temperature oxidation and corrosion, and the replacement term of the nuclear fuel cladding is reduced and may thereby cause economic loss. Furthermore, embrittlement phenomena of the nuclear fuel cladding caused by rapid oxidation reactions may degrade the ductility of materials and threaten the safety of a nuclear fuel assembly.

(Patent document 1) Korean Patent No. 10-0963472

Technical Problem

The present disclosure provides a multi-layered nuclear fuel cladding manufactured from metals different from each other and a method for manufacturing the multi-layered nuclear fuel cladding.

Technical Solution

In accordance with an exemplary embodiment, a multi-layered nuclear fuel cladding includes: an inner tube of zirconium alloy, of which both ends are open for providing an accommodation space into which a sintered body of nuclear fuel is inserted; and an outer tube, disposed coaxially with the inner tube, having a greater diameter than the inner tube so as to surround an outer surface of the inner tube, wherein the outer tube and the inner tube are fixed to closely contact each other, and may be formed from metals different from each other.

The metal that forms the outer tube may have a thermal expansion coefficient of 1 ppm/K to 40 ppm/K.

The metal that forms the outer tube may have a thermal neutron absorption cross-sectional area of 0.0045 barn to 440 barn.

The outer tube may have greater ductility than the inner tube.

The outer tube may include a protective layer provided on an outer surface of the outer tube.

The protective layer may be a metal oxide or a metal nitride of the metal configured to form the outer tuber.

In accordance with another exemplary embodiment, a method for manufacturing a multi-layered nuclear fuel cladding includes: forming a preliminary cladding by inserting a preliminary inner tube of zirconium alloy provided with an accommodation space into which a sintered body of nuclear fuel is inserted, into a preliminary outer tube having a greater diameter than the preliminary inner tube and filling the preliminary inner tube with a filler; closing both ends which are open in the preliminary cladding, with shielding members; and applying a pressure from an outside toward an inside of the preliminary cladding to reduce a diameter of the preliminary cladding, wherein the preliminary outer tube and the preliminary inner tube are formed from metals different from each other.

The metal that forms the preliminary outer tube may have a thermal neutron absorption cross-sectional area of 0.0045 barn to 440 barn.

The metal that forms the preliminary outer tube may have a thermal expansion coefficient of 1 ppm/K to 40 ppm/K.

The preliminary outer tube may have greater ductility than the preliminary inner tube.

The method for manufacturing a multi-layered nuclear fuel cladding may further include dissolving the filler inside the preliminary inner tube, after the applying of the pressure.

The method for manufacturing a multi-layered nuclear fuel cladding may further include forming a protective layer on an outer surface of the outer tube manufactured by closely and contacting and fixing the preliminary outer tube and the preliminary inner tube, after the dissolving of the filler.

The protective layer may be plasma surface treated to be formed by oxidizing or nitrifying a metal configured to form the outer tube.

In the applying of the pressure, the pressure applied to the inside of the preliminary cladding may gradually increase, by moving the preliminary cladding between a plurality of pairs of rolls which are arranged to gradually decrease distances between rolls of each of the pairs, each of the plurality of pairs of rolls are respectively comprised in each of a plurality of roll units which are arranged to be spaced apart from each other in a lengthwise direction of the preliminary cladding.

In the applying of the pressure, the preliminary outer tube may be mutually closely contacted and fixed, to the preliminary inner tube, by being more contracted than the preliminary inner tube.

Advantageous Effects

According to an exemplary embodiment, the mechanical strength of a multi-layered nuclear fuel cladding may be improved by providing an inner tube made of a zirconium alloy having superior mechanical property, and the risk of hydrogen explosion accident may be reduced by providing, on an outside, an outer tube made of metal different from the zirconium alloy to prevent oxidation of zirconium even when an accident occurs in which cooling water cannot be supplied to a nuclear reactor due to a failure of a cooling system or the like.

In addition, the outer tube may have further superior oxidation resistance by forming a protective layer on an outer surface of the outer tube, and since the progress of the surface oxidation may be prevented even a temperature rapidly increases under a nuclear power accident atmosphere, it is possible to effectively prevent water molecules from being dispersed up to the inner tube and oxidized. In addition, a stable operation of nuclear power may be enabled by enhancing the stability of nuclear fuel by preventing leak of nuclear fuel caused by a high-temperature oxidation reaction, and economical loss may be prevented by extending the replacement period of a nuclear cladding.

Furthermore, a clearance created between the inner tube and the outer tube under a high-temperature atmosphere may not be formed by forming the outer tube using a metal having a similar thermal expansion coefficient to the thermal expansion coefficient of the inner tube made of a zirconium alloy, and thus, thermal energy generated from nuclear fuel may further smoothly be transferred to a first system cooling water, and thus may lower the temperature of the nuclear fuel.

BRIEF DESCRIPTION OF THE DRAWINGS

FIG. 5 is a cross-sectional view illustrating the tube diameter reduction process and a change in an inner diameter of the preliminary cladding in accordance with another exemplary embodiment.

DETAILED DESCRIPTION

Figure 1:
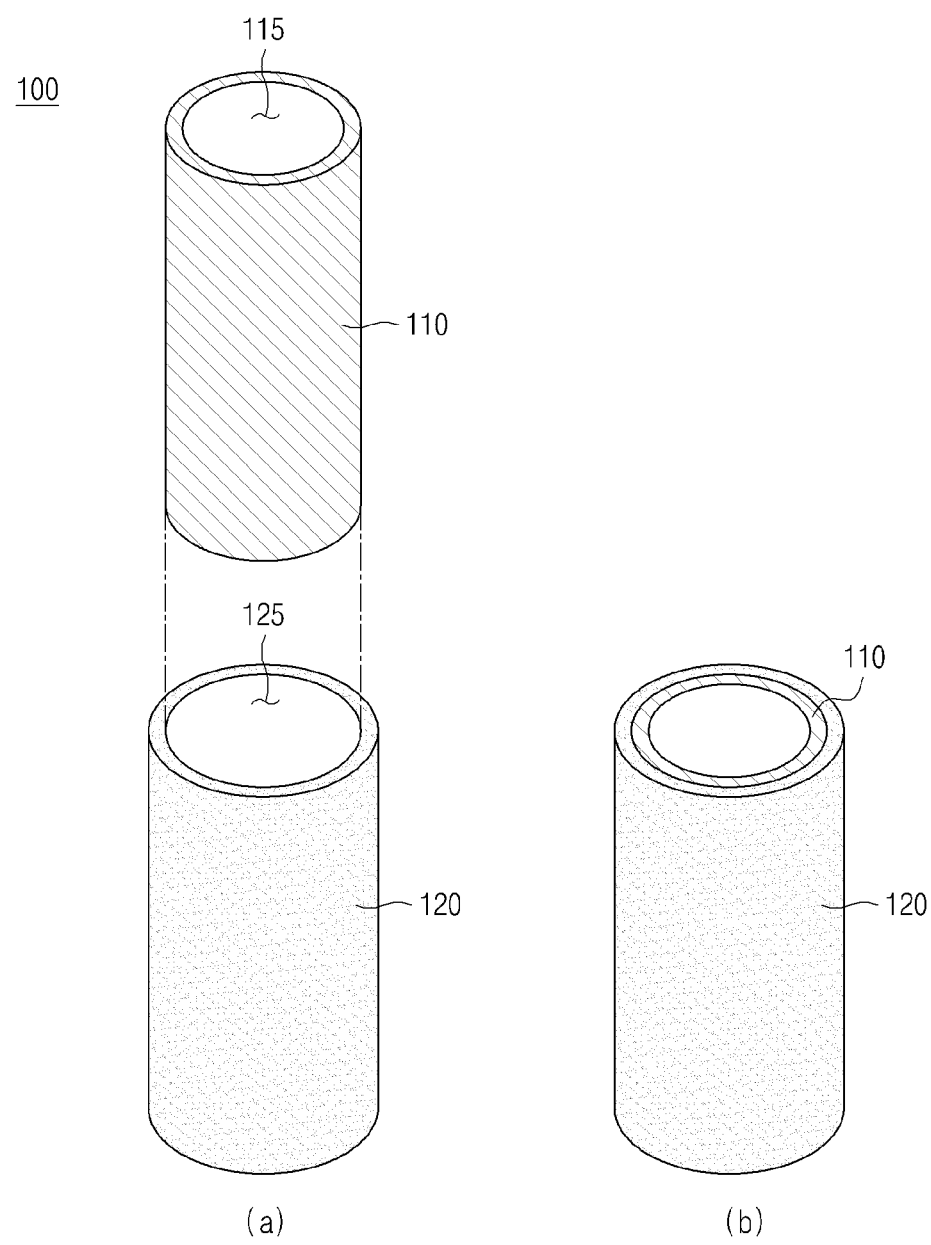
FIG. 1 is a perspective view illustrating a multi-layered nuclear fuel cladding in accordance with an exemplary embodiment.

Hereinafter, exemplary embodiments will be described in detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. The drawings may be exaggerated to describe the present disclosure in detail, and like numeral references refer to like elements in the drawings.

Figure 2:
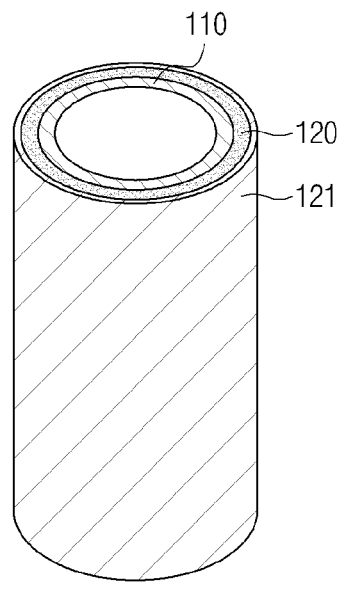
FIG. 2 is a perspective view illustrating a multi-layered nuclear fuel cladding having a protective layer formed thereon in accordance with an exemplary embodiment.

FIG. 1 is a perspective view illustrating a multi-layered nuclear fuel cladding in accordance with an exemplary embodiment, and FIG. 2 is a perspective view illustrating a multi-layered nuclear fuel cladding having a protective layer formed thereon in accordance with the exemplary embodiment. Here, (a) of FIG. 1 is an exploded perspective view of a multi-layered nuclear fuel cladding, and (b) of FIG. 1 is a perspective view of a multi-layered nuclear fuel cladding.

Referring to FIGS. 1 and 2, a multi-layered nuclear fuel cladding 100 in accordance with the exemplary embodiment may include: an inner tube 110 of zirconium alloy, of which both ends are open for providing an accommodation space 115 into which a sintered body of nuclear fuel is inserted; and an outer tube 120 which is coaxially arranged with the inner tube 110 and has a greater diameter than the inner tube 110 so as to surround an outer surface of the inner tube 110, wherein the outer tube 120 and the inner tube 110 may be fixed to be closely contact each other, and be formed from metals different from each other.

The inner tube 110 of zirconium alloy may be arranged so as to be inserted into an accommodation space 125 of the outer tube 120 to be described later, and have a hollow cylindrical shape which has two ends penetrated in one direction and has the accommodation space 115 (or hollow section) so that a sintered body of nuclear fuel is inserted thereinto.

Since the inner tube 110 is inserted into the accommodation space 125 of the outer tube 120 and arranged to be in close contact thereto, the outer diameter of the inner tube 110 may be formed to be smaller than the inner diameter of the outer tube 120. That is, the outer diameter of the inner tube 110 may be smaller than the inner diameter of the outer tube 120 so that the inner tube 110 is inserted into the accommodation space 125 of the outer tube 120, and the inner tube 110 of zirconium alloy inserted into the accommodation space 125 of the outer tube 120 may be arranged innermost in the multi-layered nuclear fuel cladding 100.

The sintered body of nuclear fuel to be inserted into the accommodation space 115 of the inner tube 110 is a cylindrical nuclear fuel pellet made of ceramic by compressing and sintering nuclear fuel materials such as uranium dioxide. A material which causes nuclear fission and radiates energy is referred to as a nuclear fuel. The nuclear fuel may be composed of elements such as uranium (atomic number 235 and 238) and plutonium (atomic number 239) which absorbs thermal neutrons or high-speed neutrons and generates energy during nuclear fission.

Here, in order to use uranium present in nature as a nuclear fuel charged in a nuclear reactor, the uranium should be processed into a sintered body having proper shape and characteristic, and therefore the uranium may be converted into uranium dioxide powder, which is a final chemical form to be used as a nuclear fuel, through a concentration process and a chemical process, and the converted powder-shaped uranium dioxide may be formed in a cylindrical shape, processed at high temperature, and be manufactured into a ceramic sintered body of nuclear fuel.

The cylindrical sintered body of nuclear fuel manufactured as such may be inserted into a nuclear fuel cladding, that is, into the accommodation space 115 of the inner tube 110 in accordance with the exemplary embodiment, and both ends of the nuclear fuel cladding may be welded and sealed with a cylindrical plug to make a nuclear fuel rod. Since the final shape of the nuclear fuel charged in the nuclear reactor is a bundle-shaped nuclear fuel assembly, several above-mentioned nuclear fuel rods may be bundled and formed into the bundle-shaped nuclear fuel assembly. Finally, nuclear fission starts when the nuclear fuel assembly is charged into cooling water of the nuclear reactor, and thermal energy is radiated. Here, a great amount of thermal energy radiated by nuclear fission chain reactions is transferred to cooling water outside the nuclear fuel cladding.

As such, the nuclear fuel cladding is a very important component which functions as a protective wall so as to protect nuclear fuel to safely generate a nuclear fission reaction and to prevent radioactive materials from leaking to the outside, and should have superior mechanical characteristics and a small thermal neutron absorption cross-sectional area in order to be used for long time.

In the exemplary embodiment, since the zirconium constituting the inner tube 110 has a very small thermal neutron absorption cross-sectional area of 0.18 barn, the probability that thermal neutrons which cause nuclear fission are absorbed to a nuclear fuel cladding is reduced. Thus, a nuclear fission reaction may effectively be generated, and thermal energy may be generated due to nuclear fission, and thus, the output of nuclear fuel may be increased. In addition, zirconium has not only a small thermal neutron absorption cross-sectional area, but also superior mechanical strength, and therefore may also be suitable for being used as a material for a nuclear fuel cladding. At this point, when manufacturing the inner tube 110 with a zirconium alloy obtained by appropriately adding a small amount of elements such as tin, niobium, iron, nickel, chromium, copper, or the like, to the zirconium the mechanical strength thereof may further be increased, so that stable operation of nuclear power may become possible.

However, since a nuclear fuel cladding formed of a zirconium alloy is in a state of being in contact with water ($H_2O$) or steam at a high temperature or a high pressure for a long time, a severe corrosion occurs in the nuclear fuel cladding, and there is a problem of being very weak in safety when an accident of losing cooling function occurs as in Fukushima nuclear disaster in Japan. That is, when an accident occurs in which it is impossible to supply cooling water to a nuclear reactor due to a failure of a cooling system or the like, there is a problem in that oxidation of zirconium rapidly progresses and the integrity of claddings is degraded, and that the risk of hydrogen explosion accident increases due to hydrogen gas generated while zirconium is oxidated and corroded. Thus, it is impossible to guarantee the safety of nuclear fuel any more.

The oxidation reaction of zirconium is expressed by the following formula.

$$Zr + 2H_2O \rightarrow ZrO_2 + 2H_2 \qquad \text{<Reaction formula 1>}$$

Thus, in an accidental situation, a nuclear fuel cladding formed of zirconium may not only discharge nuclear fuel and the like to the outside by a high-temperature oxidation reaction, but also generate hydrogen explosion. Therefore, in order to solve the problems of the nuclear fuel cladding formed of zirconium alloy and remarkably enhance the safety of nuclear fuel, the outer tube 120, formed by using a metal different from the inner tube 110, may be formed to enclose the inner tube 110 of zirconium alloy.

The outer tube 120 may have a hollow cylindrical shape, which has two ends penetrated in one direction and the accommodation space (or hollow section) 125, and the inner tube 110 may be inserted into the accommodation space 125 formed inside the outer tube 120.

The outer tube 120 may be arranged coaxially with the inner tube 110 so as to prevent leakage of nuclear fuel and hydrogen explosion due to oxidation of the inner tube 110 caused by loss of cooling function, and may enclose the outer surface of the inner tube 110, and since the inner tube 110 is inserted and arranged into the accommodation space 125 of the outer tube 120, the inner diameter of the outer tube 120 may be larger than the outer diameter of the inner tube 110.

More specifically, the outer tube 120 formed of a metal different from the inner tube 110 of zirconium alloy, such as a metal with superior corrosion-resistance, may prevent the generation of hydrogen caused by a reaction of the inner tube 110 and high-temperature steam under high-temperature and high-pressure atmosphere due to loss of cooling function, and may protect a sintered body of nuclear fuel charged in the accommodation space 115 of the inner tube 110 from high-temperature oxidation, and thus may enhance nuclear power operation safety. In other words, a hydrogen explosion accident occurring in a nuclear power plant has a very close relation with the oxidation characteristic of zirconium. Therefore, when the outer tube 120 is formed by using a metal different from the inner tube 110 of zirconium alloy so as to enclose the inner tube 110 from the outside, the outer tube 120 may improve the oxidation resistance against a loss of cooling water, and thus may also prevent the inner tube 110 from oxidation and corrosion.

Thus, the dual-structure nuclear fuel cladding of the exemplary embodiment, which takes only strong points of the inner tube 110 of zirconium alloy and the outer tube 120, may improve mechanical strength, effectively reduce the accident risk due to high-temperature oxidation, and protect the inner tube 110 and the nuclear fuel accommodated in the inner tube 110 from a nuclear reactor accident, and thus, safe operation of nuclear power is enabled.

The outer tube 120 and the inner tube 110 inserted into the accommodation space 125 of the outer tube 120, which have the above characteristics, may be closely contacted and fixed each other, and in the method for manufacturing a nuclear fuel cladding 100 to be described later, the outer tube 120 and the inner tube 110 may be closely contacted and fixed each other, by a pressure applied from the outside toward the inside of a preliminary outer tube 220 and by a supporting force of a filler 230 which fills the accommodation space 115 of a preliminary inner tube 210 against external pressure. That is, the outer tube 120 may have a greater ductility than the inner tube 110 so that the outer tube 120 may completely be in close contact with the outer surface of the inner tube 110 during the tube reduction process. Accordingly, the outer tube 120 and the inner tube 110 may have a minimized clearance therebetween during the tube diameter reduction process and be closely contacted and fixed each other. This close contact method for outer tube 120 and the inner tube 110 will be described in detail through a method for manufacturing a multi-layered nuclear fuel cladding to be described later.

The metal that forms the outer tube 120 may have a thermal expansion coefficient of 1 ppm/K to 40 ppm/K.

The thermal expansion coefficient of zirconium that forms the inner tube 110 is approximately 3.3 ppm/K to 4.0 ppm/K, and the thermal expansion coefficient of a metal forming the outer tube 120 that is closely contacted and fixed with the inner tube 110, may be 1 ppm/K to 40 ppm/K similar to that of zirconium.

When the thermal expansion coefficients of the inner tube 110 and the outer tube 120 have large difference from each other in a nuclear fuel cladding in which a great amount of thermal energy is radiated due to a nuclear fission reaction, volume expansion is caused by the mutually different thermal expansion coefficients and a separation space or a clearance may be created between the inner tube 110 and the outer tube 120. That is, when the thermal expansion coefficient of the outer tube 120 is, for example, greater than 40 ppm/K which is substantially greater than the thermal expansion coefficient of approximately 3.3 ppm/K to 4.0 ppm/K of the inner tube 110 of zirconium alloy, the outer tube 120 further expands than the inner tube 110 of zirconium alloy under a high-temperature atmosphere, and a clearance is created between the outer surface of the inner tube 110 and the inner surface of the outer tube 120 due to the difference in the thermal expansion coefficients of the inner tube 110 and the outer tube 120 which are closely contacted and fixed each other.

When a clearance is created between the outer surface of the inner tube 110 and the inner surface of the outer tube 120, thermal conductivity is lowered, and therefore there are problems in that not only the heat generated by nuclear fission may not be quickly transferred to cooling water through the nuclear fuel cladding, but also the nuclear fuel accommodated in the accommodation space 115 of the inner tube 110 has a higher temperature than the cooling water, and thus, safety against accidents of melting of nuclear fuel and nuclear reactor may not be secured. In addition, there occurs a problem in that when the operation of a nuclear reactor is stopped, cracks may occur in the inner tube or the outer tube due to a temperature change, and a fracture is thereby caused and radioactive materials included in the nuclear fuel may leak to the outside.

Thus, the outer tube 120 is formed by using a metal having a thermal expansion coefficient of 1 ppm/K to 40 ppm/K that is similar to the thermal expansion coefficient of the inner tube 110 of zirconium alloy, so as to prevent clearance from being created between the inner tube 110 and the outer tube 120. Thus, thermal energy generated in the sintered bodies of nuclear fuel accommodated in the nuclear fuel cladding, more specifically, in the accommodation space 115 of the inner tube 110 may further smoothly be transferred to the outer cooling water of the nuclear fuel cladding, and accordingly, the output of the nuclear fuel may be improved and the temperature of the sintered bodies of nuclear fuel may be lowered.

The metal that forms the outer tube 120 may have a thermal neutron absorption cross-sectional area of 0.0045 barn to 440 barn.

The outer tube 120 may be formed by using a metal having a thermal neutron absorption cross-sectional area of 0.0045 barn to 440 barn, and the thermal neutron absorption cross-sectional area means a cross-sectional area with respect to the neutron absorption. That is, neutrons such as thermal neutrons or high-speed neutrons do not have an electrical charge and easily approaches an atomic nucleus and causes various mutual actions. Among these, a cross-sectional area with respect to an absorption reaction toward a target atomic nucleus is referred to as a neutron absorption cross-sectional area. $10^{-28}$ $m^2$ or barn is used as a unit of the neutron absorption cross-sectional area.

First, nuclear fission occurs such that when a neutron is emitted to a heavy atomic nucleus such as uranium or plutonium, the atomic nucleus is broken into two pieces while absorbing the neuron and nuclear fission occurs, and a great amount of thermal energy and two to three neutrons are output at the time when the atomic nucleus is broken into two pieces.

The nuclear fission is expressed by the flowing reaction formula 2.

$$\text{atomic nucleus+neutron} \rightarrow \text{nuclear fission products} \\ \text{(radioactive materials)+2-3 neutrons+thermal} \\ \text{energy} \qquad \text{<Reaction formula 2>}$$

In other words, nuclear fission occurs while the atomic nucleus and the neutron react, and the 2-3 neutrons radiated during one nuclear fission lose energy by a moderator and are decelerated. The neutron (thermal neutron) radiated from the atomic nucleus and decelerated causes another nuclear fission while colliding with another atomic nucleus, and a repetitive nuclear fission reaction (nuclear fission chain reaction) occurs due to such thermal neutrons, and a great amount of thermal energy is generated in this process.

As such, a decelerated thermal neutron should be absorbed to an atomic nucleus in order to cause a nuclear fission chain reaction for producing a great amount of energy. When a metal forming the outer tube 120 has a thermal neutron absorption cross-sectional area greater than 440 barn, the probability increases that the thermal neutron which causes nuclear fission is absorbed to the nuclear fuel cladding and therefore the probability of occurrence of a nuclear fission reaction decreases, and accordingly, thermal energy generated by nuclear fission is not generated, and thus, there is a problem in that the output of nuclear fuel is lowered. Conversely, when a metal forming the outer tube 120 has a thermal neutron absorption cross-sectional area smaller than 0.0045 barn, it may be effective to a nuclear fission reaction, but there is a problem in that it is difficult to actually form and manufacture the outer tube 120.

Thus, the metal that forms the outer tube 120 in accordance with the exemplary embodiment may have a thermal neutron absorption cross-sectional area of 0.0045 barn to 440 barn, and metals having a thermal neutron absorption cross-sectional area of 0.0045 barn to 440 barn may include, for example, Mg (0.059 barn), Si (0.13 barn), Pb (0.17 barn), Al (0.23 barn), Zn (1.1 barn), Nb (1.1 barn), Ba (1.2 barn), Sr (1.2 barn), Ge (2.3 barn), Fe (2.4 barn), Mo (2.4 barn), Cr (2.9 barn), Ti (3.3 barn), Cu (3.6 barn), Ni (4.5 barn), Te (4.5 barn), Sb (6.7 barn), Mn (13 barn), W (19 barn), Ta (21 barn), Co (35 barn), Hf (115 barn), Ir (440 barn), or the like. The metal that forms the outer tube 120 are not limited to the above metal, but a metal may form the outer tube 120 as long as the metal has a thermal neutron absorption cross-sectional area of 0.0045 barn to 440 barn.

When the outer tube 120 in accordance with the exemplary embodiment satisfies the thermal expansion coefficient of 1 ppm/K to 40 ppm/K, the thermal neutron absorption cross-sectional area of 0.0045 barn to 440 barn, and the higher ductility than zirconium, a very superior effect may be exhibited as a nuclear fuel cladding, but required characteristics may selectively be applied to the outer tube 120 if necessary even without satisfying the three conditions.

In another exemplary embodiment, the outer tube 120 may include a protective layer 121 provided to the outer surface of the outer tube 120 in order to have further superior oxidation resistance, and the protective layer 121 may be a metal oxide or a metal nitride of a metal that forms the outer tube 120.

The protective layer 121 may be a metal that forms the outer tube 120, for example, an aluminum oxide that is a metal oxide of aluminum or an aluminum nitride that is a metal nitride of aluminum, and the protective layer formed to be dense and thin on the outer surface of the outer tube 120 may further improve the oxidation resistance of the outer tube 120 and cause the outer tube to have very superior corrosion resistance.

At this point, in order to prevent water molecules under an accident atmosphere or a high-temperature steam ($H_2O$) atmosphere from passing through the outer tube 120, being introduced up to the outer surface of the inner tube 110, and reacting with zirconium of the inner tube 110, the protective layer 121 formed of a metal oxide may be more effective, but the protective layer 121 formed of a metal nitride may also be densely formed on the outer surface of the outer tube 120 and have a superior high-hardness characteristic, and thus, stable operation of nuclear power may be enabled.

In another exemplary embodiment, an aluminum oxide protective layer 121 formed by oxidation of aluminum that forms the outer tube 120 is formed in a thin and dense form on the outer surface of the outer tube formed of aluminum. Therefore, it is possible to limit the progress of oxidation to the surface of the outer tube 120 and prevent water molecules from passing through the outer tube 120 and being inserted up to the outer surface of the inner tube 110, and accordingly, it is possible to suppress an oxidation reaction in which zirconium in the inner tube 110 reacts with water molecules and generates hydrogen, and protects the sintered bodies of nuclear fuel contained in the accommodation space 115 of the inner tube 110 from oxidation and corrosion, so as to enhance the safety of nuclear power operation.

Thus, the mechanical strength of the nuclear fuel cladding may be improved by providing the inner tube 110 made of a zirconium alloy having superior mechanical strength, and may protect the inner tube 110 and the nuclear fuel by providing the outer tube 120 formed of a metal and a metal oxide different from the zirconium alloy because the protective layer 121 of a metal oxide film is not oxidized any more even when an accident such as loss of cooling materials in a nuclear reactor.

Hereinafter, the above-mentioned multi-layered nuclear fuel cladding 100 is defined again, and then a method for manufacturing the multi-layered nuclear fuel cladding 100 in accordance with the exemplary embodiment will be described.

As described above, the multi-layered nuclear fuel cladding 100 may improve the safety of nuclear power operation not only in a normal operation but also in an occurrence of accident because the inner tube 110 of zirconium alloy is inserted into the outer tube 120, the inner tube 110 of zirconium alloy may serve a first protective function of nuclear fuel and improve the mechanical strength of the multi-layered nuclear fuel cladding 100, and the outer tube 120 formed of a metal different from the inner tube 110 of zirconium alloy may prevent corrosion of the inner tube 110 from an accident such as a failure of cooling system.

Figure 3:
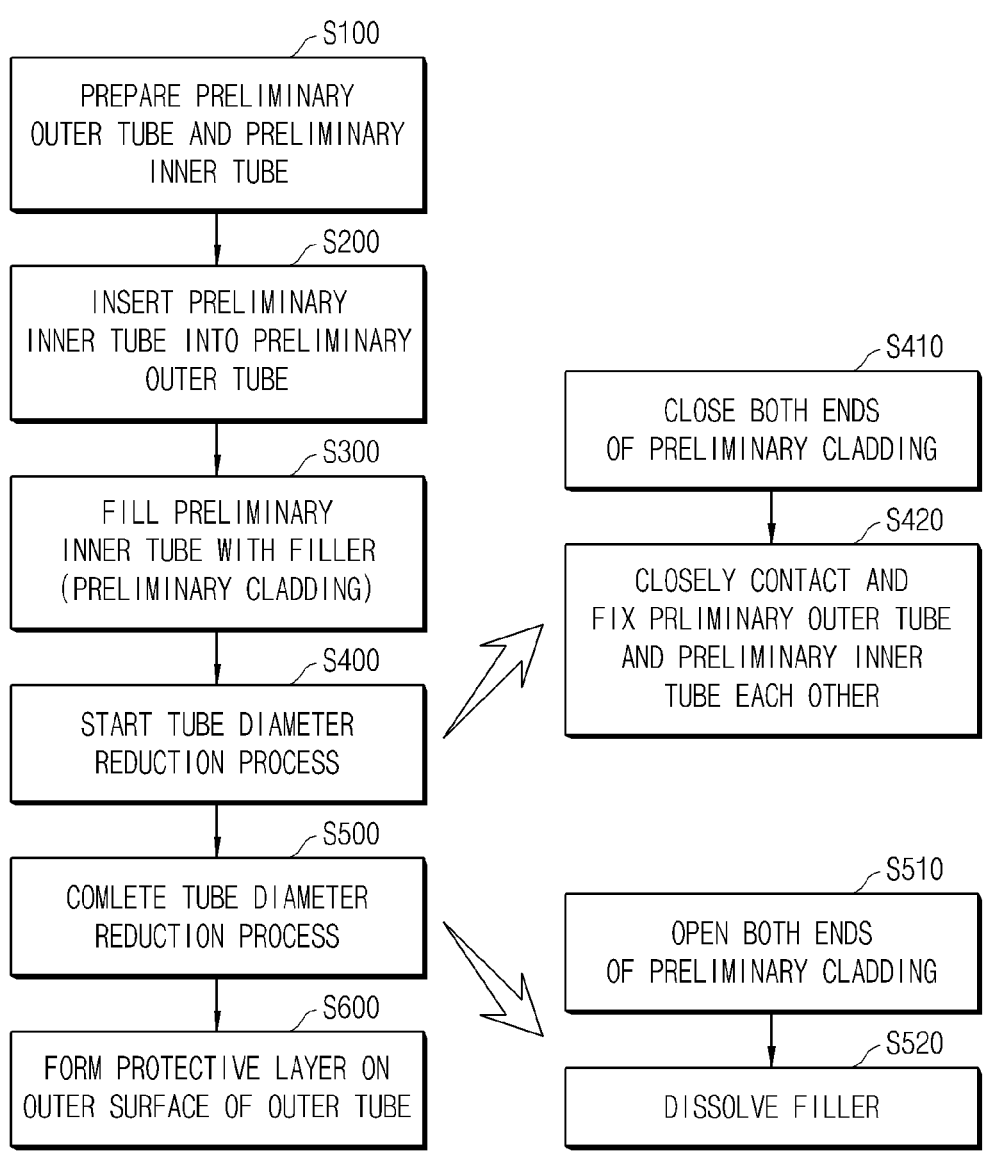
FIG. 3 is a flowchart illustrating a method for manufacturing a multi-layered nuclear fuel cladding in accordance with another exemplary embodiment.
Figure 4:
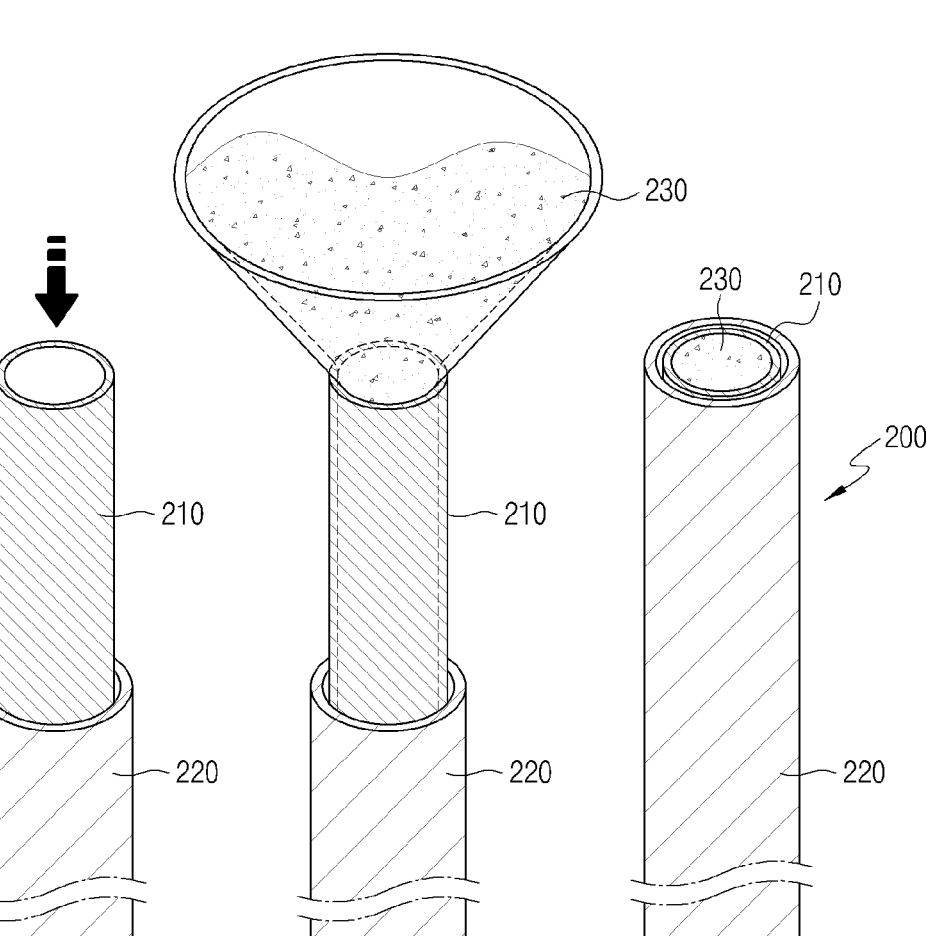
FIG. 4 is a perspective view illustrating a step for manufacturing a preliminary cladding for performing a tube diameter reduction process in accordance with another exemplary embodiment.
Figure 5:
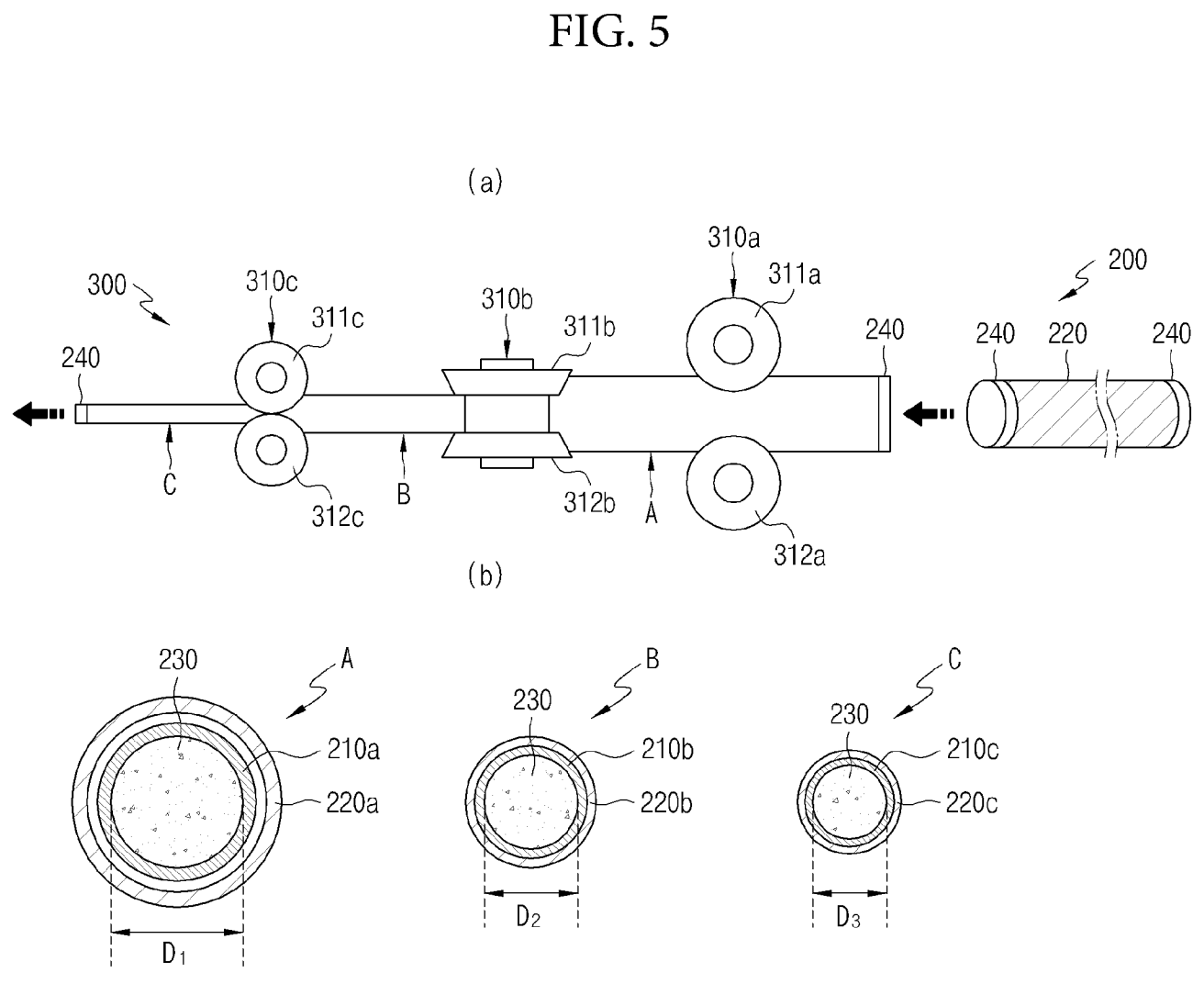
Figure 6:
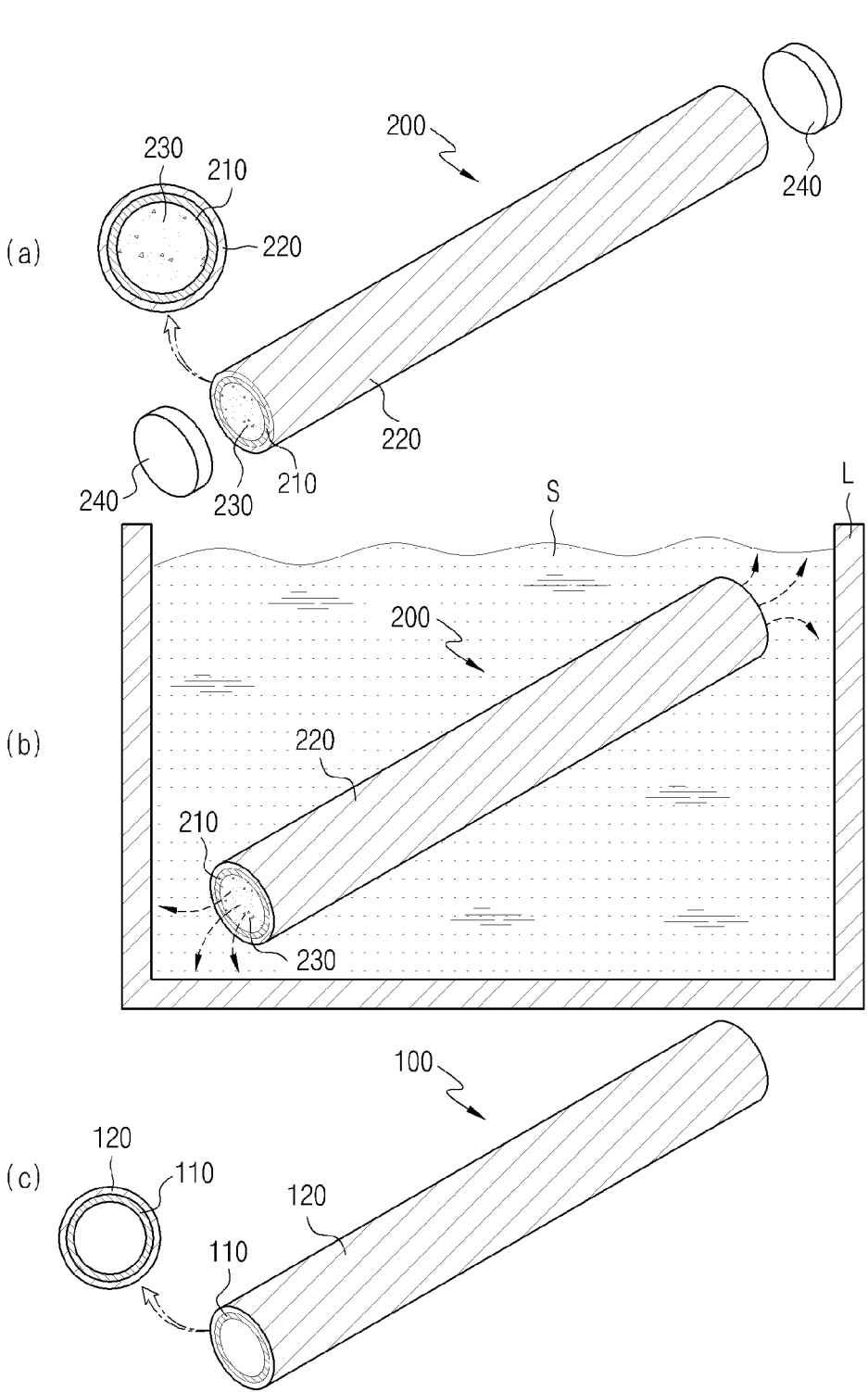
FIG. 6 is a perspective view illustrating a step for dissolving a filler after the tube diameter reduction process in accordance with another exemplary embodiment.

FIG. 3 is a flowchart illustrating a method for manufacturing the multi-layered nuclear fuel cladding in accordance with another exemplary embodiment, and FIG. 4 is a perspective view illustrating a step for manufacturing a preliminary cladding for performing a tube diameter reduction process in accordance with another exemplary embodiment. In addition, FIG. 5 is a cross-sectional view illustrating the tube diameter reduction process and a change in an inner diameter of the preliminary cladding in accordance with another exemplary embodiment, and FIG. 6 is a perspective view illustrating a step for dissolving a filler after the tube diameter reduction process in accordance with another exemplary embodiment.

Referring to FIGS. 3 to 6, a method for manufacturing the multi-layered nuclear fuel cladding 100 in accordance with another exemplary embodiment may include: inserting a preliminary inner tube 210 of zirconium alloy provided with an accommodation space into which a sintered body of nuclear fuel is inserted, into a preliminary outer tube 220 having a greater diameter than the preliminary inner tube 210, and filling the filler 230 into the preliminary inner tube 210 to form a preliminary cladding 200; closing both ends which are open in the preliminary cladding 200, with shielding members 240; and applying a pressure from the outside toward the inside of the preliminary cladding 200 and reducing the diameter of the preliminary cladding 200, wherein the preliminary outer tube 220 and the preliminary inner tube 210 may be formed from metals different from each other. In addition, dissolving the filler 230 inside the preliminary inner tube 210 after the applying a pressure may further be provided.

First, the preliminary inner tube 210 provided with the accommodation space, into which a sintered body of nuclear fuel is inserted, and manufactured by using a zirconium alloy having superior mechanical strength is prepared, and the preliminary outer tube 220 capable of improving the corrosion resistance of the nuclear fuel cladding is prepared (S100). In the exemplary embodiment, a zirconium alloy is used for the preliminary inner tube 210, and a metal having a thermal neutron absorption cross-sectional area of 0.0045 barn to 440 barn and a thermal expansion coefficient of 1 ppm/K to 40 ppm/K may be used for the preliminary outer tube 220. Here, the preliminary outer tube 220 may have greater ductility than the preliminary inner tube 210.

More specifically, a metal that forms the preliminary outer tube 220 may have a thermal neutron adsorption cross-sectional area of approximately 0.0045 barn to approximately 440 barn, and the thermal neutron adsorption cross-sectional area is a cross-sectional area with respect to the absorption reaction in which a thermal neutron is absorbed to a target atomic nucleus. When the sintered body of nuclear fuel is inserted into the accommodation space of the preliminary inner tube 210, and a neutron is emitted to an atomic nucleus of nuclear fuel, for example, uranium-235 included in the sintered body of nuclear fuel, nuclear fission occurs in which the atomic nucleus is broken into two pieces while absorbing the neutron, and 2-3 neutrons are output together with a great amount of energy while nuclear fission occurs.

In other words, nuclear fission occurs while the atomic nucleus and the neutron react, and the 2-3 neutrons radiated during one nuclear fission lose energy by a moderator and are decelerated. The decelerated neutrons (thermal neutrons) cause nuclear fission again while colliding with another atomic nucleus, and a nuclear fission chain reaction occurs due to such thermal neutrons.

As such, a decelerated thermal neutron should be absorbed to an atomic nucleus in order to cause a nuclear fission chain reaction for producing a great amount of energy. When a metal forming the preliminary outer tube 220 has a thermal neutron absorption cross-sectional area greater than 440 barn, the probability increases that the thermal neutron which causes nuclear fission is absorbed to the nuclear fuel cladding and therefore the probability of occurrence of a nuclear fission reaction decreases, and accordingly, thermal energy generated by nuclear fission is not generated, and thus, there is a problem in that the output of nuclear fuel is lowered. Conversely, when the metal forming the preliminary outer tube 220 has a thermal neutron absorption cross-sectional area smaller than 0.0045 barn, it may be effective to a nuclear fission reaction, but there is a problem in that it is difficult to actually form and manufacture the preliminary outer tube 220.

In addition, the metal that forms the preliminary outer tube 220 may have a thermal expansion coefficient of 1 ppm/K to 40 ppm/K, and the thermal expansion coefficient of the zirconium that forms the preliminary inner tube 210 is approximately 3.3 ppm/K to 4.0 ppm/K, and the thermal expansion coefficient of the metal that forms the preliminary outer tube 220 which is closely contacted and fixed, with the preliminary inner tube 210, through the tube diameter reduction process to be described later may be 1 ppm/K to 40 ppm/K similar to zirconium.

When the thermal expansion coefficients of the preliminary inner tube 210 and the preliminary outer tube 220 are different from each other in a nuclear fuel cladding in which a great amount of thermal energy is radiated due to a nuclear fission reaction, volume expansion is caused by the mutually different thermal expansion coefficients and a clearance may be created between the preliminary inner tube 110 and the preliminary outer tube 220.

When a clearance is created between the outer surface of the preliminary inner tube 210 and the inner surface of the preliminary outer tube 220, thermal conductivity is lowered, and therefore there is a problem in that not only the heat generated by nuclear fission may not be quickly transferred to cooling water through the nuclear fuel cladding, but also the sintered body of nuclear fuel accommodated in the accommodation space of the preliminary inner tube 210 has a higher temperature than the cooling water, and thus, safety against an accident of nuclear reactor may not be secured.

Thus, creation of clearance between the preliminary inner tube 210 and the preliminary outer tube 220 is prevented in advance even under a high-temperature atmosphere caused by nuclear fission by providing the preliminary outer tube 220 formed of a metal having a thermal expansion coefficient of 1 ppm/K to 40 ppm/K similar to the thermal expansion coefficient of the preliminary inner tube 210 formed of a zirconium alloy, and thus, the output of nuclear fuel may be improved by transferring, to cooling water, the thermal energy generated from the sintered body of nuclear fuel accommodated in the accommodation space of the preliminary inner tube 210.

After preparing the preliminary outer tube 220 and the preliminary inner tube 210 which have the above characteristics, inserting the preliminary inner tube 210 of zirconium alloy provided with an accommodation space, into which the sintered body of nuclear fuel is inserted, into the preliminary outer tube 220 having a greater diameter than the preliminary inner tube 210 (S200), and the preliminary cladding 200 is formed, by filling the preliminary inner tube 210 with the filler 230 (S300).

As shown in (a) of FIG. 3, the preliminary inner tube 210 may be inserted into the accommodation space of the preliminary outer tube 220, and at this point, a predetermined separation gap is present between the preliminary outer tube 220 and the preliminary inner tube 210 inserted into the preliminary outer tube 220. That is, since the outer diameter of the preliminary inner tube 210 should have a diameter of a degree that may be inserted into the preliminary outer tube 220, the outer diameter of the preliminary inner tube 210 may be smaller than the diameter of the accommodation space of the preliminary outer tube 220.

In prior arts, in order to mitigate the separation between the plurality of tubes, a method was used in which a mandrel was inserted, then a pressure was applied from the outside while drawing to increase close contact force between the plurality of multiple tubes or to reduce the diameter and stretch the tubes. However, such a method was performed in a state in which the mandrel is inserted into the preliminary inner tube 210, and a problem was caused in which the preliminary inner tube 210 (that is, the inner tube 110) was damaged or failure is caused due to friction between the preliminary inner tube 210 and the mandrel.

Meanwhile, in the tube diameter reduction process in accordance with the exemplary embodiment, even when a gap is present between the preliminary inner tube 210 and the preliminary outer tube 220, occurrence of defects in the preliminary inner tube 210 is suppressed or prevented, and the preliminary outer tube 220 and the preliminary inner tube 210 may be brought into close contact with each other. That is, a conventional configuration of the mandrel is not required, and there is no friction between the preliminary inner tube 210 and components, so that the preliminary inner tube 210 may be prevented or suppressed from being torn or damaged by friction and being defected.

Accordingly, as shown in (b) and (c) of FIG. 4, the preliminary cladding 200 may be formed by filling the filler 230 into the preliminary inner tube 210 in order to increase the close contact force between the preliminary inner tube 210 and the preliminary outer tube 220, to reduce the diameter, or suppress deformation and defect occurrence due to a pressure applied for drawing in the tube reduction process.

The filler 230 fills the preliminary inner tube 210 in order to form the preliminary cladding 200, and more specifically, the filler may function to increase the close contact force between the preliminary outer tube 220 and the preliminary inner tube 210, change the diameter of the multi-layered nuclear fuel cladding 100 to be manufactured, and buffer the pressure applied to the preliminary cladding 200 when performing the tube diameter reduction process for drawing. That is, the filler 230, as shown in (b) and (c) of FIG. 4, may fill the accommodation space of the preliminary inner tube 210, and in the tube reduction process, the filler may provide a resistive force against the pressure applied to the inside of the preliminary cladding 200 from the outside of the preliminary cladding 200.

Fine powder which has water solubility and dissolvability to be easily dissolvable in a chemical solution may be used as the filler 230 for reducing the occurrence of defect in the preliminary inner tube 210 compared to a solid of larger lump when filling the accommodation space of the preliminary inner tube 210. The fine powder may enable a dissolving solution, such as an aqueous solution or a chemical solution, to evenly penetrate into the filler 230 inside the preliminary inner tube 210 when dissolving the filler 230 of the preliminary cladding 200 after completing the tube reduction process.

As the sequence of FIG. 5, when the preliminary cladding 200 is formed, the tube diameter reduction process for manufacturing the multi-layered nuclear fuel cladding 100 may be started so as to increase the close contact force between the preliminary outer tube 220 and the preliminary inner tube 210 of the preliminary cladding 200, and have a desired shape, diameter, and length (S400).

At this point, for the tube reduction process, both ends which are open in the preliminary cladding 200 may be closed by shielding members 240 (S410).

Closing of both ends of the preliminary cladding 200 is performed by shielding exposed portions of both ends of the preliminary outer tube 220 and the preliminary inner tube 210 by the shielding members 240, and in this step, after inserting the preliminary inner tube 210 into the preliminary outer tube 220, the exposed portion of one end among both open ends of the preliminary outer tube 220 and the preliminary inner tube 210 is first covered with the shielding member 240, then the preliminary inner tube 210 is filled with the filler 230, and the exposed portion of the other end may be closed by being covered with the shielding member 240.

As shown in FIG. 5, the shielding members 240 may close both ends of the preliminary cladding 200 by covering the exposed portions of both the end portions thereof, and by shielding, with the shielding members 240, the exposed portions of the preliminary outer tube 220 and the preliminary inner tube 210 of the preliminary cladding 200, the filler 230 inside the preliminary inner tube 210 does not leak to the outside, and a stable tube diameter reduction process may be performed. Various members capable of covering the exposed portions of both ends may be used as the shielding member 240.

After closing both open ends of the preliminary claddings 200 with the shielding members 240, the diameter of the preliminary cladding 200 may be reduced through the tube diameter reduction process for applying a pressure from the outside toward the inside of the preliminary cladding 200, and in the applying of the pressure, the preliminary outer tube 220 may be mutually closely contacted and fixed, to the preliminary inner tube 210, by being more contracted than the preliminary inner tube 210 (S420).

In addition, in the applying the pressure, the pressure applied to the inside of the preliminary cladding 200 may gradually be increased, by moving the preliminary cladding 200 between a plurality of pairs of rolls which have gradually reduced separation distances between rolls of each of pairs. Here, the respective plurality of pairs of rolls are respectively comprised in each of a plurality of roll units 310a, 310b, and 310c that are disposed to be spaced apart from each other in the lengthwise direction of the preliminary cladding 200.

In the preliminary cladding 200, the preliminary outer tube 220 and the preliminary inner tube 210 are closely contacted and fixed each other, by reducing the separation distance therebetween through a tube diameter reducing device 300, and the diameter of the preliminary cladding 200 may be reduced and the length thereof may be increased through compression and drawing. Here, the tube diameter reduction process will be described referring to FIG. 5.

The tube diameter reducing device 300 may cause the length of the preliminary cladding 200 to be increased and the diameter thereof to be reduced by compressing the preliminary cladding 200 with rollers from the outside, and may cause the preliminary outer tube 220 and the preliminary inner tube 210 of the preliminary cladding 200 to be formed in close contact with each other by applying a pressure from the outside. At this point, the tube diameter reducing device 300 may include at least one of roll units 310a, 310b, and 310c which are arranged to be spaced apart from each other in the lengthwise direction (that is, one direction) of the preliminary cladding 200. That is, in the exemplary embodiment, a first roll unit 310a, a second roll unit 310b, and a third roll unit 310c may be provided so as to be spaced apart from each other in the lengthwise direction of the preliminary cladding 200. At this point, each of the roll units 310a, 310b, and 310c is provided with first rolls 311a, 311b, and 311c and second rolls 312a, 312b, and 312c which make contact with the outer surface of the preliminary cladding 200 interposed therebetween, and the preliminary cladding 200 advances between the first rolls 311a, 311b, and 311c and the second rolls 312a, 312b, and 312c, and thus, a pressure may be applied from the outside toward the inside of the preliminary cladding 200. That is, the first rolls 311a, 311b, and 311c and the second rolls 312a, 312b, and 312c may be provided so as to be in contact with and to face each other on the outer surface of the preliminary cladding 200 on the basis of the preliminary cladding 200. When the preliminary cladding 200 passes between the first rolls 311a, 311b, and 311c and the second rolls 312a, 312b, and 312c, the diameter of the preliminary cladding 200 may be reduced and the preliminary outer tube 220 and the preliminary inner tube 210 may be brought into close contact with each other by the pressure applied thereto by coming into contact with the first rolls 311a, 311b, and 311c and the second rolls 312a, 312b, and 312c.

Here, as shown in (a) of FIG. 5, points of the preliminary cladding 200 passing through the plurality of roll units 310a, 310b and 310c are classified into A, B, and C, and regarding the diameter and the thickness thereof, as shown in (b) of FIG. 5, it may be understood that as the number of the roll units 310a, 310b and 310c through which the preliminary cladding 200 passes increases, the diameter of the preliminary cladding 200, that is, the diameter of the accommodation space of the preliminary inner tube 210 gradually decreases from D1 to D3. As the respective separation distances between the first rolls 311a, 311b and 311c and the second rolls 312a, 312b and 312c of each of the plurality of roll units 310a, 310b and, 310c decrease, the pressure applied to the preliminary cladding 200 gradually increases, and thus, the preliminary cladding 200 is deformed.

In the exemplary embodiment, it has been described that three roll units 310a, 310b and 310c are provided, and each of the roll units 310a, 310b, and 310c is configured by two rolls of the first rolls 311a, 311b, and 311c and the second rolls 312a, 312b, and 312c, but the number of the rolls and the roll units 310a, 310b and 310c is not limited thereto, but may be changed into various numbers. In addition, in (b) of FIG. 5 in the exemplary embodiment, the diameter of the preliminary cladding 200 is illustrated to be largely reduced, but this is merely an illustration for explaining the change in diameter to help understanding the difference.

Meanwhile, more specifically, referring to (a) of FIG. 5, in a method for fixing the preliminary outer tube 220 and the preliminary inner tube 210 to be in close contact with each other by increasing the close contact force therebetween through the tube reduction process, the preliminary outer tube 220 move between the first rolls 311a, 311b, and 311c and the second rolls 312a, 312b, and 312c, so that a pressure is applied to the inside of the preliminary cladding 200 by the pressure applied by the rolls. At this point, the filler 230 present inside the preliminary inner tube 210 of the preliminary cladding 200 supports the preliminary inner tube 210 from the pressure applied toward the inside because the filler 230 fully fills the accommodation space of the preliminary inner tube 210. That is, explaining relatively, since the filler 230 has strength that supports the preliminary inner tube 210 against the pressure applied from the outside, and since the preliminary inner tube 210 is at a certain position and the preliminary outer tube 220 is further contracted compared to the preliminary inner tube 210 due to the external pressure and to be pushed toward the preliminary inner tube 210, the preliminary outer tube 220 and the preliminary inner tube 210 may be closely contacted and fixed each other. That is, the preliminary outer tube 220 may have greater ductility than the preliminary inner tube 210, that is, the preliminary outer tube 220 may have greater ductility than the preliminary inner tube 210 so as to be in completely close contact with the outer surface of the preliminary inner tube 210 while a pressure is applied to the preliminary cladding 200, and since the preliminary outer tube 220 has sufficient ductility compared to the preliminary inner tube 210, the gap between the preliminary outer tube 220 and the preliminary inner tube 210 may be minimized and the preliminary outer tube 220 may be closely contacted and fixed, with the preliminary inner tube 210.

When completing the tube diameter reduction process with the abovementioned method (S500), as shown in (a) of FIG. 6, both closed ends of the preliminary cladding 200 is opened (S510), so that the filler 230 inside the preliminary inner tube 210 may be dissolved and removed in a state in which both ends of the preliminary cladding 200 are exposed to the outside (S520). That is, both ends of the preliminary cladding 200 is opened by removing the shielding members 240 provided on both ends of the preliminary cladding 200, and as shown in (b) of FIG. 6, the filler 230 may be dissolved by being immersed in a solution S accommodated in a container L.

Aforementioned solutions (water-soluble solution and chemical solution) may be used as the solution for dissolving the filler 230, and in the exemplary embodiment, the filler 230 is removed by immersing the preliminary cladding 200 in a solution, but the exemplary embodiment is not limited thereto, and the filler 230 may also be dissolved by pouring the solution into the accommodation space of the preliminary inner tube 210 and causing the solution to penetrate between the filler 230.

A cladding may be obtained in which the close contact force between the inner tube 110 and the outer tube 120 may be increased, and the inner tube 110 and the outer tube 120 are closely contacted and fixed each other, by dissolving and removing the filler 230 in the preliminary cladding 200 in which preliminary inner tube 210 and the preliminary outer tube 220 are closely contacted and fixed each other through the tube reduction process.

After the dissolving of the filler 230, forming the protective layer 121 on the outer surface of the outer tube 120 manufactured by closely contacting and fixing the preliminary outer tube 220 and the preliminary inner tube 210 may further be provided (S600), and the protective layer 121 may be formed by the oxidation or nitrification of the metal constituting the outer tube 120 through plasma surface treatment.

Referring again to FIG. 2, after dissolving the filler 230, the protective layer 121 may be formed on the outer surface of the cladding manufactured by closely contacting and fixing the preliminary outer tube 220 and the preliminary inner tube 210 to each other, and more specifically, on the outer surface of the outer tube 120. The protective layer 121 may be a metal oxide film or a metal nitride film, and a general surface treatment method for forming such the metal oxide film or the metal nitride film may be performed in a high-temperature process of approximately 600° C. to 1,000° C. However, when the surface treatment of the outer tube 120 is performed at a high temperature, a problem is caused such degradation of mechanical characteristics or chemical characteristics of the cladding, and therefore a low-temperature process is required which is capable of minimizing a change in the mechanical property and the crystal structure of the cladding.

Thus, in the exemplary embodiment, a plasma surface treatment method of a low-temperature process was used in order to form a metal oxide film or a metal nitride film. Since in the plasma surface treatment, high energy of plasma may effectively lower the heat treatment temperature of the cladding by 200° C. to 500° C., the surface treatment of the outer tube 120 may be performed even at a low temperature, and thus, changes in the mechanical property and the crystal structure of the cladding may be minimized.

Accordingly, the protective layer 121 of the exemplary embodiment may be formed by the plasma surface treatment, and the metal that forms the outer surface of the outer tube 120 may be changed into a metal oxide by causing the gas particles (for example, $O_2$) under a plasma atmosphere and a metal that forms the outer tube 120 to react with each other. In other words, the protective layer 121 made of a thin and dense metal oxide is formed on the outer surface of a metal that forms the outer tube 120 by plasma surface treatment of a low-temperature process, and thus, the mechanical property of the cladding may be maintained and a more superior corrosion resistance property may be provided to the outer tube 120 by preventing the contact between the metal that forms the outer tube 120 and oxygen or steam. Detailed effects exhibited by forming the protective layer 121 are the same as the aforementioned effects of the protective layer 121, and thus, repetitive description (or effect) will not be provided.

So far, in the detailed description of the present disclosure, specific exemplary embodiments have been described, but various modifications can be made thereto without departing from the spirit and scope of the present disclosure. Therefore, the scope of the invention is defined not by the detailed description of the invention but by the appended claims, and all differences within the scope will be construed as being included in the present inventive concept.

The invention claimed is:

1. A method for manufacturing a multi-layered nuclear fuel cladding comprising:

forming a preliminary cladding by inserting a preliminary inner tube of zirconium alloy provided with an accommodation space into which a sintered body of nuclear fuel is inserted, into a preliminary outer tube having a greater diameter than the preliminary inner tube and filling the preliminary inner tube with a filler;

closing both ends which are open in the preliminary cladding, with shielding members;

applying a pressure from an outside toward an inside of the preliminary cladding to reduce a diameter of the preliminary cladding; and forming a protective layer on an outer surface of an outer tube manufactured by closely contacting and fixing the preliminary outer tube and the preliminary inner tube, wherein the preliminary outer tube and the preliminary inner tube are formed from metals different from each other, and wherein the protective layer is formed by oxidation or nitrification of the metal constituting the outer tube through plasma surface treatment and is made of a metal oxide or metal nitride formed denser and thinner than the outer tube to prevent water molecules from passing through the outer tube and being inserted up to the outer surface of the inner tube.

2. The method for manufacturing a multi-layered nuclear fuel cladding of claim 1, wherein a metal configured to form the preliminary outer tube has a thermal neutron absorption cross-sectional area of 0.0045 barn to 440 barn.

3. The method for manufacturing a multi-layered nuclear fuel cladding of claim 1, wherein the metal configured to form the preliminary outer tube has a thermal expansion coefficient of 1 ppm/K to 40 ppm/K.

4. The method for manufacturing a multi-layered nuclear fuel cladding of claim 1, wherein the preliminary outer tube has greater ductility than the preliminary inner tube.

5. The method for manufacturing a multi-layered nuclear fuel cladding of claim 1, further comprising dissolving the filler inside the preliminary inner tube, after the applying of the pressure.

6. The method for manufacturing a multi-layered nuclear fuel cladding of claim 1, wherein in the applying of the pressure, the pressure applied to the inside of the preliminary cladding gradually increases, by moving the preliminary cladding between a plurality of pairs of rolls which are arranged to gradually decrease distances between rolls of each of the pairs, each of the plurality of pairs of rolls are respectively comprised in each of a plurality of roll units which are arranged to be spaced apart from each other in a lengthwise direction of the preliminary cladding.

7. The method for manufacturing a multi-layered nuclear fuel cladding of claim 1, wherein in the applying of the pressure, the preliminary outer tube is mutually closely contacted and fixed, to the preliminary inner tube, by being more contracted than the preliminary inner tube.

* * * * *